(12) United States Patent
Shen et al.

(10) Patent No.: US 12,435,031 B2
(45) Date of Patent: Oct. 7, 2025

(54) COMPOUND WITH BROAD-SPECTRUM ANTIBACTERIAL ACTIVITY AND ITS ANTIBACTERIAL COMPOSITION

(71) Applicant: CHINA AGRICULTURAL UNIVERSITY, Beijing (CN)

(72) Inventors: Jianzhong Shen, Beijing (CN); Kui Zhu, Beijing (CN); Xiaoyu Li, Beijing (CN); Kaixiang Zhou, Beijing (CN); Changsi Mao, Beijing (CN); Yawei Cai, Beijing (CN); Jijun Kang, Beijing (CN); Congming Wu, Beijing (CN); Xingyuan Cao, Beijing (CN); Dejun Liu, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 0 days.

(21) Appl. No.: 18/843,258

(22) PCT Filed: Jan. 26, 2024

(86) PCT No.: PCT/CN2024/074217
§ 371 (c)(1),
(2) Date: Sep. 1, 2024

(87) PCT Pub. No.: WO2025/086494
PCT Pub. Date: May 1, 2025

(65) Prior Publication Data
US 2025/0129013 A1    Apr. 24, 2025

(30) Foreign Application Priority Data

Oct. 23, 2023   (CN) .......................... 202311372798.8

(51) Int. Cl.
*C07C 235/64*   (2006.01)
*A61K 31/167*   (2006.01)
(Continued)

(52) U.S. Cl.
CPC .......... *C07C 235/64* (2013.01); *A61K 31/167* (2013.01); *A61K 38/12* (2013.01); *A61P 31/04* (2018.01); *A61P 31/10* (2018.01)

(58) Field of Classification Search
CPC ....... A61K 31/167; A61K 38/12; A61P 31/04; A61P 31/10; C07C 235/64
See application file for complete search history.

(56) References Cited

U.S. PATENT DOCUMENTS

2004/0259877 A1   12/2004  Muto et al.
2006/0019958 A1   1/2006   Muto et al.
(Continued)

FOREIGN PATENT DOCUMENTS

CN    1489458 A    4/2004
CN    1658854 A    8/2005
(Continued)

OTHER PUBLICATIONS

Kang, Sunghyun et al. "Discovery of novel 2-hydroxydiarylamide derivatives as TMPRSS4 inhibitors"; Bioorganic & Medicinal Chemistry Letters; Mar. 15, 2023; vol. 23, No. 6; pp. 1748-1751.
(Continued)

*Primary Examiner* — Renee Claytor
*Assistant Examiner* — Andrew P Lee
(74) *Attorney, Agent, or Firm* — NKL Law; Allen Xue (57) ABSTRACT

A compound with broad-spectrum antibacterial activity and its antibacterial composition are provided. The compound with broad-spectrum antibacterial activity has formula (I), which are antibacterial drug source compounds with a broad antibacterial spectrum, good antibacterial activity, suitable in vivo pharmacokinetics, and significant in vivo therapeutic effects. Preferred compound BAB159 has good antibacterial activity against *Staphylococcus, Clostridium perfringens, Enterococcus, Bacillus, Streptococcus, Haemophilus, Can-*
(Continued)

*dida krusei, Aspergillus niger,* and *Trichophyton*, which is comparable or better than the listed drugs. The combination of preferred compound BAB159 and polymyxin E exhibits significantly enhanced synergistic antibacterial activity, especially against multidrug-resistant strains.

8 Claims, 9 Drawing Sheets

(51) Int. Cl.
    *A61K 38/12*     (2006.01)
    *A61P 31/04*     (2006.01)
    *A61P 31/10*     (2006.01)

(56) References Cited

U.S. PATENT DOCUMENTS

| | | |
|---|---|---|
| 2019/0274978 A1 | 9/2019 | Ackerley et al. |
| 2021/0205292 A1 | 7/2021 | Sakamoto et al. |
| 2022/0143005 A1 | 5/2022 | Guzel et al. |
| 2022/0356147 A1 | 11/2022 | Melander et al. |

FOREIGN PATENT DOCUMENTS

| | | |
|---|---|---|
| CN | 1958565 A | 5/2007 |
| CN | 102697760 A | 10/2012 |
| CN | 109475515 A | 3/2019 |
| CN | 115869385 A | 3/2023 |
| CN | 115919830 A | 4/2023 |
| CN | 117105809 A | 11/2023 |
| WO | 2020172206 A1 | 8/2020 |
| WO | 2022109148 A1 | 5/2022 |

OTHER PUBLICATIONS

Nemeth, Ansley M. et al. "Structure Function Studies on IMD-0354 Identifies Highly Active Colistin Adjuvants"; ChemMedChem.; Jan. 17, 2020; vol. 15, No. 2; pp. 210-218.

Gamo, Francisco-Javier et al. "Thousands of chemical starting points for antimalarial lead identification"; Nature; May 20, 2010; vol. 465; pp. 305-310.

COMPOUND WITH BROAD-SPECTRUM ANTIBACTERIAL ACTIVITY AND ITS ANTIBACTERIAL COMPOSITION

FIELD OF INVENTION

The present invention belongs to the field of antibacterial compound technology, and specifically relates to a compound with broad-spectrum antibacterial activity and its antibacterial composition.

BACKGROUND OF THE INVENTION

With the widespread use of antibiotics, resistance of pathogenic bacteria has become increasingly severe, and bacterial infections, especially those caused by multidrug-resistant bacteria, are facing a situation where no drugs are available. *Clostridium perfringens* has shown high resistance rates to many antibiotics, such as lincomycin (76.9%), doxycycline (69.2%), tilmicosin (65.4%), and tiamulin (50.0%), with some MIC values reaching 128 μg/mL or even higher. According to research, if left uncontrolled, the number of deaths caused by drug resistance is expected to reach 10 million by 2050. In response to the serious public health threat posed by bacterial resistance, the World Health Organization (WHO) and the US Food and Drug Administration (FDA) have successively released lists of bacteria in urgent need of novel antibiotics (WHO, 2017; FDA, 2017), demonstrating the urgency of developing novel antibiotics.

The development of "super antibiotics" capable of combating drug-resistant bacteria has become a rigid requirement for medical development. However, due to the limited variety of natural product structures and the decreasing frequency of discovery, the development of novel antibiotics from natural sources has become increasingly difficult. At the same time, due to the shorter treatment cycle of antibiotics compared to drugs for hypertension, diabetes, leukemia and other drugs, the development investment and income are relatively low, and the pharmaceutical companies have insufficient development incentives for novel antibiotics. In the past 50 years, only one new type of antibacterial drug from natural sources, daptomycin, has been put into clinical use. At present, the artificial design and modification of compounds that may have antibacterial potential is an important means of discovering novel antibacterial compounds, which has received widespread attention in recent years.

Benzoyl aniline derivatives are widely used, which have a backbone based on salicylic acid and are bound to aniline derivatives with aromatic rings through amide bonds. They have various biological activities such as weed control, insecticidal, antibacterial, and anticancer. Previous studies have modified the substituents of benzoyl aniline compounds while obtaining some compounds with antibacterial activity against Gram positive bacteria (Bakker et al, *J Am Chem Soc*, 2023, 145, 1136). Upon comparison, it can be found that the compounds provided by Bakker et al (2023) are mostly heterocyclic structures, and the 12 compounds provided by Bakker et al (2023) have the lowest MIC of 6.25 μg/mL against MRSA, which is not enough to meet the current practical needs. After searching, as of January 2023, there are two application patents based on benzoyl aniline as the parent nucleus structure. CN1958565A proposes a novel snail killing drug; CN102697760A proposes the application of niclosamide or its salts in the preparation of drugs for the prevention and treatment of pulmonary fibrosis. However, no such compounds have been reported as spectral antibacterial drugs, especially against bacteria and their composition.

SUMMARY OF THE PRESENT INVENTION

To fill the gap in the application of compounds with benzoyl aniline as the parent nucleus structure in antibacterial fields, and to propose a fully synthesized benzoyl aniline compound with independent intellectual property rights for antibacterial applications. The present invention proposes a compound with broad-spectrum antibacterial activity, which can be modified with functional groups to obtain compounds with different activities and uses using benzoyl aniline as the parent nucleus. The compound BAB159 with the best effect was screened. The compound provided by the present invention has a broad antibacterial spectrum, good antibacterial activity, suitable in vivo pharmacokinetics, and significant in vivo therapeutic effects.

Meanwhile, the present invention also discovered that BAB159 and polymyxin E have a synergistic effect. The combination of the two in an appropriate proportion has superior antibacterial activity, especially the activity of multidrug-resistant bacteria. In the current environment where various bacteria are gradually developing resistance to common antibiotics, it has extremely important practical significance and clinical research needs. To solve the above technical problems, the present invention provides the following technical solutions:

a compound with broad-spectrum antibacterial activity, having the following formula (I):

wherein, $R_1$, $R_2$, $R_3$, $R_4$, and $R_5$ are selected from at least one of H, $C_{1-4}$ alkyl, $C_{1-4}$ alkoxy, halogen, hydroxyl, and nitro; wherein H atoms on the $C_{1-4}$ alkyl and/or the $C_{1-4}$ alkoxy are optionally replaced by halogen atom or halogen atoms, provided that at least two of $R_1$, $R_2$, $R_3$, $R_4$, and $R_5$ are halogens, but not more than four.

Preferably, at least one of $R_1$, $R_2$, $R_3$, $R_4$, and $R_5$ is $CF_3$, but not more than two.

In a preferred technical solution of the present invention, the compound with broad-spectrum antibacterial activity is the following specific compound:

BAB142

-continued

After extensive screening, the inventor selected the specific compounds mentioned above as representative benzoyl aniline derivatives with broad-spectrum antibacterial activity in the present invention. Preferably, compound BAB159 exhibits the strongest antibacterial activity and has a broad-spectrum antibacterial activity, superior to most known commercial conventional antibiotics.

The present invention also provides an antibacterial composition, comprising the following active ingredients: the compound shown in above formula (I), and polymyxin.

Furthermore, in the antibacterial composition, concentration ratio of the compound shown in formula (I) to polymyxin is 1-3:1-3. The concentration ratio is the mass concentration ratio. The mass concentration of the compound shown in formula (I) varies for different bacteria, generally ranging from 0.01 to 16 µg/mL, preferably 0.1 to 1 µg/mL, such as 0.5 µg/mL.

Furthermore, the polymyxin is selected from at least one of polymyxin A, polymyxin B, polymyxin C, polymyxin D, and polymyxin E, preferably polymyxin E.

In a preferred technical solution of the present invention, the active ingredients of the antibacterial composition are BAB159 and polymyxin E.

More preferably, concentration ratio of BAB159 to polymyxin E is 1-3:1-3.

The inventor unexpectedly found that the compound BAB159 of the present invention, in combination with polymyxin, particularly polymyxin E, exhibits significant synergistic antibacterial activity (FIC<0.078) against multidrug-resistant *E. coli* B2, particularly against multidrug-resistant strains. However, such a strong synergistic antibacterial activity was not observed in BAB159 and other antibacterial compounds such as ciprofloxacin, kanamycin, and polymyxin B.

The present invention also provides the use of the compound with broad-spectrum antibacterial activity or the antibacterial composition in the preparation of antibacterial drugs.

Furthermore, the antibacterial drug has inhibitory/bactericidal effects on fungi and bacteria, the bacteria comprising at least one of *Staphylococcus, Clostridium perfringens, Enterococcus, Bacillus, Streptococcus, Haemophilus*, and *Mycobacterium smegmatis*; the fungi comprising at least one of *Candida, Aspergillus niger, Aspergillus flavus*, and *Trichophyton*.

The excellent effects of the present invention are:
1. The present invention provides a novel antibacterial drug source compound with a broad antibacterial spectrum, good antibacterial activity, suitable in vivo pharmacokinetics, and significant in vivo therapeutic effects for clinical use. The preferred compound BAB159 has a minimum inhibitory concentration ($MIC_{50}$) of 0.01 µg/mL, 0.25 µg/mL, 0.25 µg/mL, 0.01 µg/mL, 0.125 µg/mL, and 16 µg/mL for *Staphylococcus* (including MRSA), *Clostridium perfringens, Enterococcus, Bacillus, Streptococcus*, and *Haemophilus*, respectively. The MIC values for *Candida krusei* ATCC 6258, *Aspergillus niger, Aspergillus flavus*, and *Trichophyton* were 1 µg/mL, 0.25 µg/mL, 1 µg/mL, and 0.125 µg/mL, respectively. The antibacterial activity of BAB159 provided by the present invention against common clinical pathogens is comparable or superior to the listed drugs linezolid, ceftiofur, penicillin, vancomycin, lincomycin, doxycycline, trimethoprim, tiamulin, quinolone, and amphotericin B. The compounds provided by the present invention enrich the molecular library of the antibacterial drug source, alleviate the severe situation of drug resistance, and provide a new treatment option for infections caused by clinically resistant pathogens. In the current reality where more and more bacteria are developing resistance to antibiotics, it has extremely important scientific research value and clinical practical significance.
2. It was also unexpected to find that the combination of BAB159 compound and polymyxin E exhibits significantly enhanced synergistic antibacterial activity, particularly against multidrug-resistant strains. Therefore, the antibacterial composition with BAB159 compound and polymyxin E as active ingredients may play a significant role.

DETAILED DESCRIPTION OF THE INVENTION

In order to clarify the purpose, technical solution, and advantages of the present invention, a detailed description of the technical solution of the present invention will be provided below. The following embodiments facilitate a better understanding of the present invention, but do not limit the present invention. The experimental methods in the following embodiments, unless otherwise specified, are all conventional methods.

The standard strains used in the present invention, such as *Staphylococcus aureus* ATCC 29213 and *Candida krusei* ATCC 6258, were purchased from the National Standard Material Network. Clinical strains, such as A57-1, B58-2, A3-2, B4 and B5, were isolated from animal tissues, excreta, and feeding environments. The above strains are stored in the National Key Laboratory of Veterinary Public Health and Safety as required.

Preparation Example

Taking compound BAB159 as an example, the synthesis strategy for preparing compound (I) of the present invention is illustrated. When preparing other compounds, it is only necessary to replace the raw materials with different substituents to obtain the other compounds through the same synthesis strategy for preparing BAB159.

The synthesis route of compound BAB159 is as follows:

Specifically, it includes the following steps:

(S1) Add tetrahydrofuran to a there-necked flask and stir to replace nitrogen. Cool down to −75° C. Add 29.8 g butyl lithium (1 eq) and 47.1 g diisopropylamine (1 eq) dropwise at controlled temperature and stir for 10 minutes. Then add 100 g of 1,2-dichloro-3-(trifluoromethyl)benzene (1 eq) dropwise and incubate for two hours after the addition. The reaction solution was poured into dry ice, naturally heated to room temperature and stirred overnight. The reaction solution was concentrated to remove tetrahydrofuran, and 100 mL of water and 200 mL of ethyl acetate were added. The acid was adjusted to pH 3, and the liquid was separated. The organic phase was concentrated to obtain the crude product, which was then slurried with n-hexane and filtered to obtain 72 g of intermediate product Cpd1 with a yield of 60%.

(S2) Add 72 g (1 eq) of Cpd1 and 720 mL of dioxane to a single-necked flask to dissolve evenly. Then, add 350 mL of tert-butanol, 112 g (4 eq) of triethylamine, and 115 g of diphenylphosphoryl azide (1.5 eq) in sequence. After nitrogen replacement three times, react overnight. Pour the reaction solution into ice, concentrate with ethyl acetate for extraction, and stir the organic phase (petroleum ether:ethyl acetate=20:1) to obtain 72 g of intermediate product Cpd2 with a yield of 78.4%.

(S3) Add 72 g of Cpd2 to a single-necked flask, dissolve in 720 mL of ethyl acetate, and then add 720 mL of saturated hydrochloric acid ethyl acetate and stir overnight. The white solid that gradually precipitates is the product. The solid obtained by filtration is 57 g of intermediate product Cpd3 with a yield of 98%.

(S4) Dissolve 100 g of salicylic acid in 1 L of dichloromethane, add 8 mL of N, N-dimethylformamide, and add 1.2 eq of oxalyl chloride under ice bath conditions. React at room temperature for 2 hours until the reaction becomes clarified. After the central control is completed, spin-dry to obtain the acyl chloride compound, which is ready for use.

(S5) Add 50 g (1 eq) of Cpd3 and acetonitrile to a single-necked flask and stir evenly, add potassium iodide (62 g (2 eq)), and slowly add 43 g (dissolved in acetonitrile) of the acyl chloride compound (1.2 eq) prepared in step (S4), and react at 80° C. for 16 hours. Let it stand overnight until a solid precipitate is formed. After filtration, dissolve the filter cake in ethyl acetate and wash it twice with water. Dry the organic phase and spin-dry the resulting product, which was then slurried with dichloromethane and filter the solid to obtain product BAB159 with a yield of 38.4%.

Figure 1:
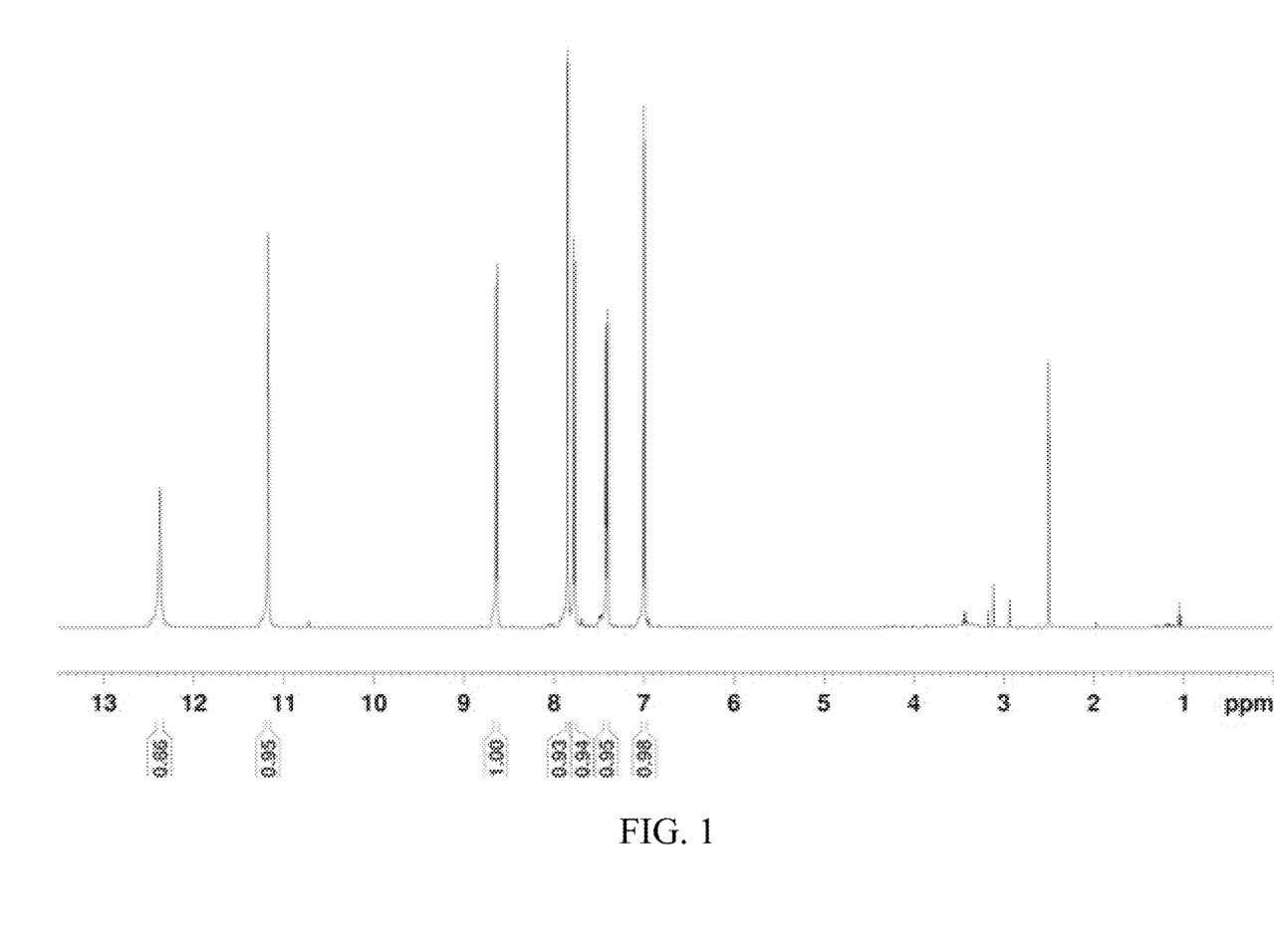
FIG. 1 shows the 1H NMR of compound BAB159 in DMSO solvent.
Figure 2:
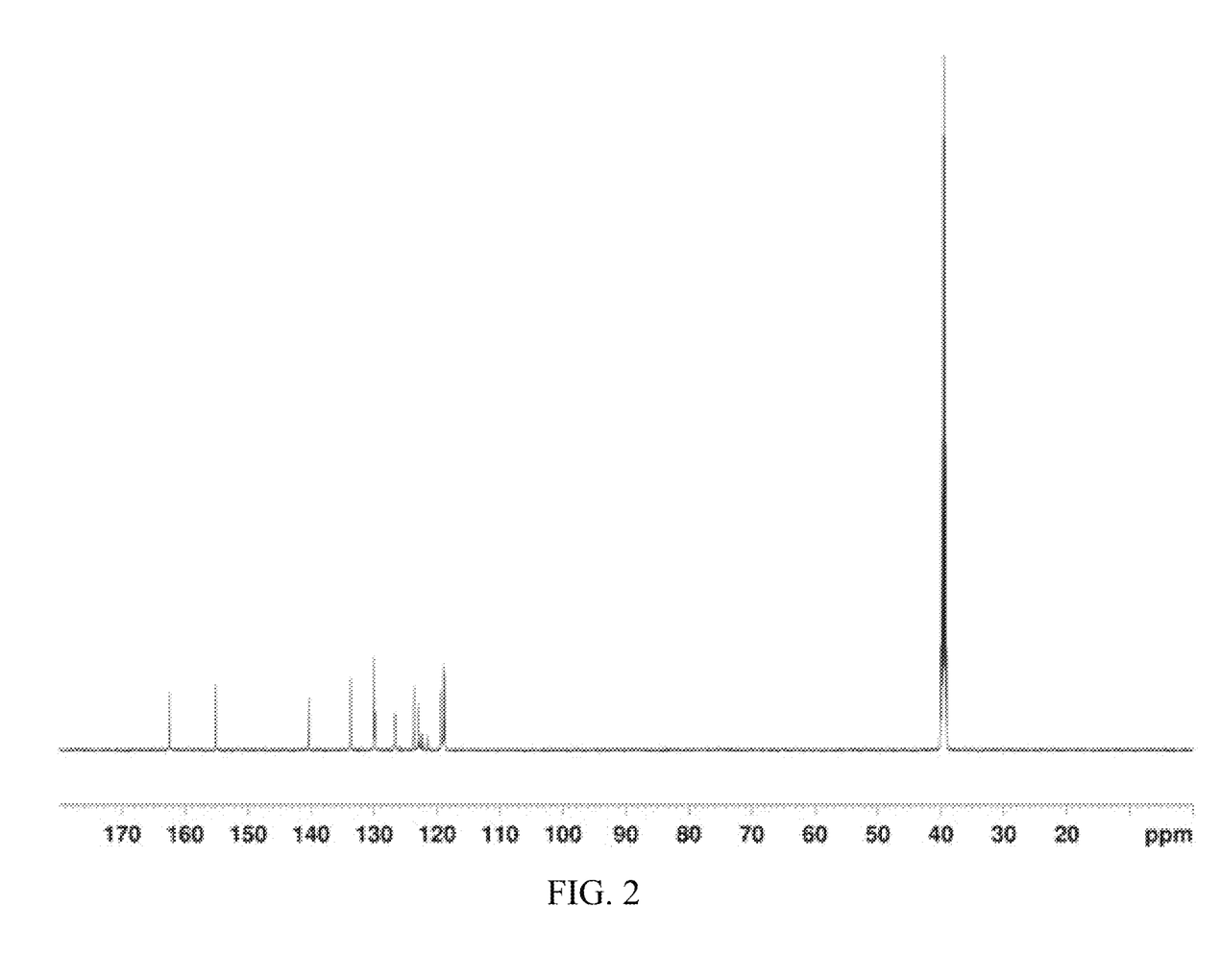
FIG. 2 shows the 13C NMR of compound BAB159.
Figure 3:
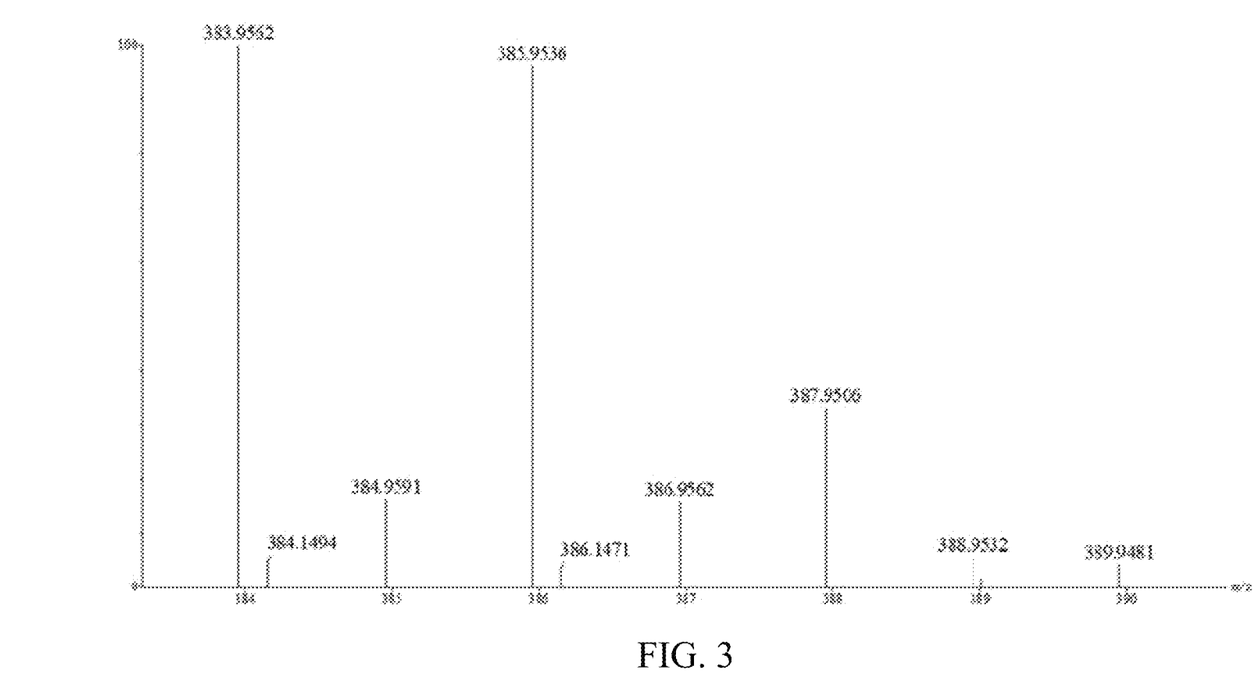
FIG. 3 shows the high-resolution mass spectrum of compound BAB159 in positive ion mode.
Figure 4:
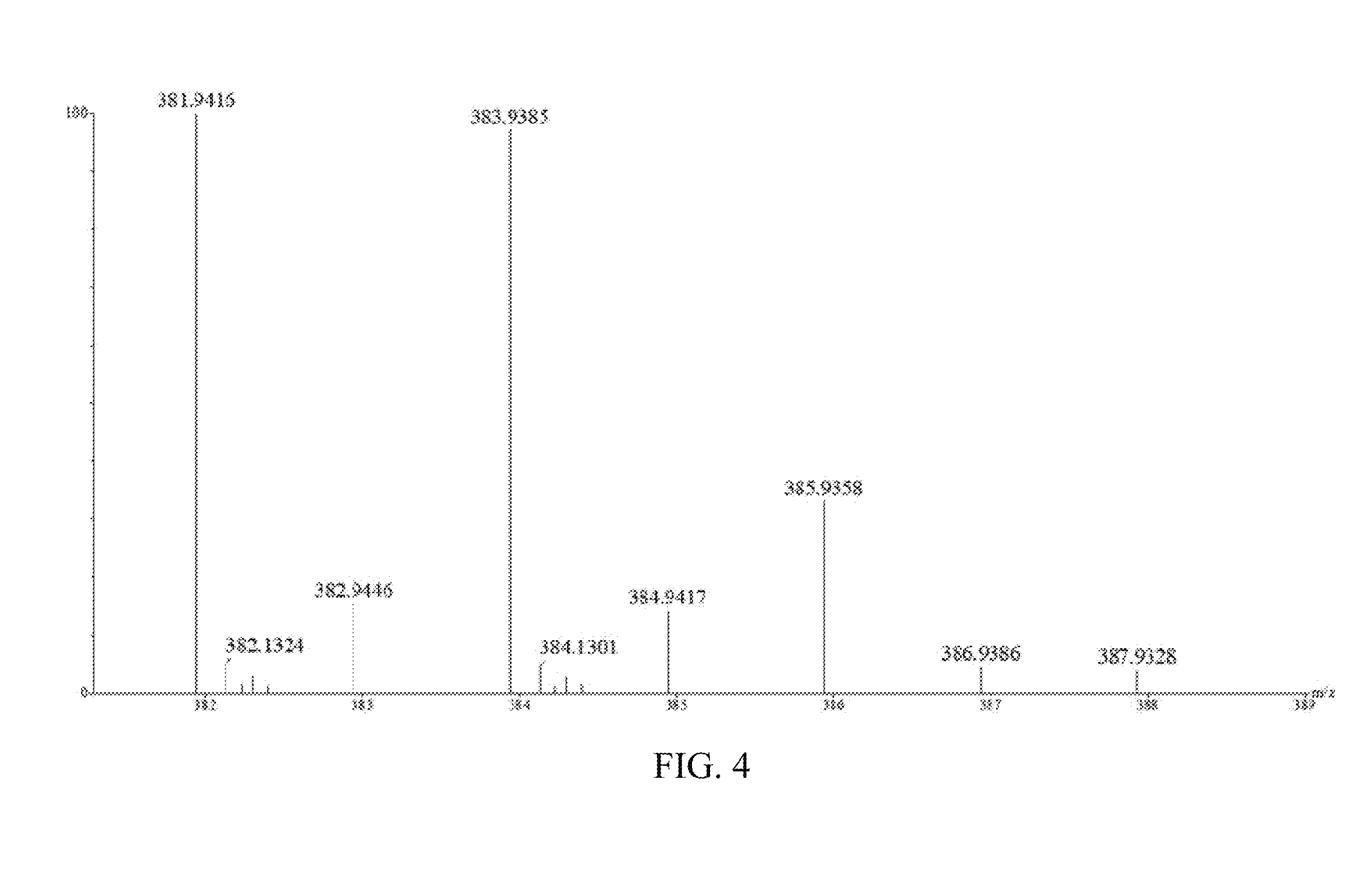
FIG. 4 shows the high-resolution mass spectrum of compound BAB159 in negative ion mode.
Figure 5:
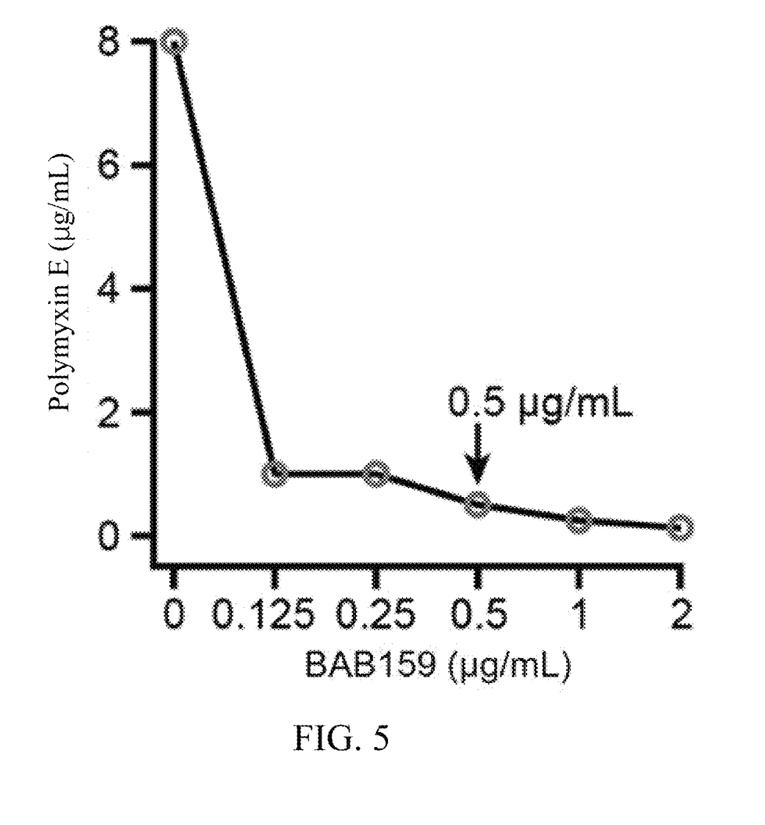
FIG. 5 shows the synergistic antibacterial activity of compound BAB159 in combination with polymyxin E on multidrug-resistant bacteria *E. coli* B2.

FIG. 1 shows the 1H NMR of compound BAB159 in DMSO solvent. FIG. 2 shows the 13C NMR of compound BAB159. FIG. 3 shows the high-resolution mass spectrum of compound BAB159 in positive ion mode. FIG. 4 shows the high-resolution mass spectrum of compound BAB159 in negative ion mode. From FIG. 1 to FIG. 4, it can be determined that the structure of compound BAB159 obtained in S5 is as follows:

BAB159

Embodiment 1 Antibacterial Activity of BAB159 Against Common Clinical Pathogenic Bacteria and Fungi Accurately weigh the compound BAB159 prepared in the preparation example, dissolve it appropriately in dimethyl sulfoxide (DMSO), add 100 μL of MHB broth culture medium to a 96 well U-shaped plate, take 100 μL of a certain concentration of the compound and add it to the first column of the 96-well U-shaped plate, and dilute it to the 10th column by multiple ratio. Select single colonies of the test strain and culture them in BHI broth on a shaker at 37° C. until the bacterial logarithmic growth stage. Adjust the bacterial turbidity to 0.5 McF using a Maxwell turbidimeter and dilute 100-fold (approximately $10^6$ CFU/mL) with MHB broth culture medium. Take 100 μL of the above bacterial solution and add it to a 96 well U-shaped plate. The 11th and 12th columns only contain MHB broth culture medium and the test bacterial solution, respectively, as negative and positive controls. Place the 96-well U-shaped plate in a 37° C. constant temperature incubator for 16-18 hours, read the experimental results, and determine the minimum inhibitory concentration (MIC) of the compound as the visible lowest drug concentration that inhibits bacterial growth. The results are shown in Tables 1 and 2 below.

The number of more types of bacteria and strains were determined by compound BAB159, the results are shown in Table 1. Compound BAB159 has good antibacterial activity against pathogenic bacteria including *Staphylococcus* (50 strains), *Enterococcus* (27 strains), *Bacillus* (21 strains), *Clostridium perfringens* (35 strains), *Streptococcus* (30 strains), and *Mycobacterium smegmatis* (1 strain), with MIC values of 0.01 μg/mL, 0.25 μg/mL, 0.01 μg/mL, 0.25 μg/mL, 0.125 μg/mL, and 2 μg/mL, respectively. BAB159 has better or equivalent antibacterial activity than vancomycin and linezolid.

TABLE 1

Antibacterial efficacy of BAB159 against common clinical pathogenic bacteria (MICs, unit: μg/mL)

| Project | *Staphylococcus* (n = 50) | *Enterococcus* (n = 27) | *Bacillus* (n = 21) | *Clostridium perfringens* (n = 35) | *Streptococcus* (n = 30) | *Mycobacterium smegmatis* (n = 1) |
|---|---|---|---|---|---|---|
| BAB159 | 0.01 | 0.25 | 0.01 | 0.25 | 0.125 | 2 |
| Positive control | 1 | 1 | 0.5 | 0.5 | 0.25 | 16 |

Note: Except the positive control for *Enterococcus*, which is linezolid, the positive control for all other strains is vancomycin.

Meanwhile, compound BAB159 also exhibits strong antibacterial activity against common clinical pathogenic fungi such as *Candida albicans, Aspergillus flavus, Aspergillus niger*, and *Trichophyton*, with a MIC of 0.5-1 μg/mL. In addition, BAB159 also has certain antibacterial activity against gram-negative bacteria such as *Haemophilus*, with a MIC of 8-32 μg/mL. Based on the above research results, BAB159 provided by the present invention has better or equivalent antibacterial activity against different bacterial genera such as Gram-positive bacteria, some Gram-negative bacteria, and fungi than listed drugs. Its further application will undoubtedly be beneficial for the prevention and control of related diseases in clinical practice.

TABLE 2

Antibacterial efficacy of BAB159 against common clinical pathogenic fungi (MICs, unit: μg/mL)

| | MICs (μg/mL) | |
|---|---|---|
| Strains | BAB159 | Amphotericin B |
| *Candida albicans* ATCC 6258 | 1 | 0.5 |
| *Aspergillus flavus* ATCC 11492 | 1 | 0.25 |
| *Aspergillus niger* ATCC 96918 | 0.5 | 0.125 |
| *Trichophyton* ATCC MTA-4439 | 0.125 | 0.25 |

Embodiment 2

The antibacterial activity of BAB159, BAB142, BAB151, BAB160, and BAB166 against *Clostridium perfringens* was tested (n=26). The results are shown in Table 3 below.

TABLE 3

Antibacterial activity of compounds with different structures against *Clostridium perfringens* (MIC$_{50}$, unit: μg/mL)

| BAB159 | BAB142 | BAB151 | BAB160 | BAB166 |
| 0.25 | 16 | 8 | 8 | 32 |

It can be seen that among the compounds of formula (I), BAB159 has the best antibacterial activity with a $MIC_{50}$ of 0.25 μg/mL. Other similar compounds, such as BAB142, BAB151, BAB160, and BAB 166, also have certain antibacterial activity and can meet the antibacterial applications of different drug-resistant bacteria/fungi.

Embodiment 3 Comparison of Antibacterial Activity of BAB159 and Some Listed Antibiotics Against *Clostridium perfringens*

Take out the A-type standard strain A57-1 (CVCC 2030), B-type standard strain B58-2 (CVCC 60081), C-type standard strains C59-1 and C59-2 (CVCC 60101, CVCC 60102), D-type standard strain 60-2D (CVCC 60201), and E-type strain E4 of *Clostridium perfringens* purchased from the National Standard Material Network in an −80° C. freezer, thaw at room temperature, and apply them to BHA blood plates for streaking and recovery. Take out 26 clinical isolates from farms, such as A57-1, B58-2, A3-2, B4 and B5, in a −80° C. freezer, thaw at room temperature, and apply them to BHA blood plates for streaking and recovery. Culture at 37° C. in anaerobic environment for 20-24 hours, pick 3-5 single colonies with an inoculation ring, inoculate them in FTG culture medium, and let them stand at 37° C. in anaerobic environment for 12 hours. After the culture was completed, a drug sensitivity test was carried out. Adjust bacterial turbidity to 0.5 McF using a Maxwell turbidimeter and dilute 100-fold with FTG culture medium (at this time, the bacterial concentration is about $1\times10^6$ CFU/mL) for later use. Dilute the test drug to 10 concentration gradients using FTG culture medium, take 100 μL and add it to a 96 well U-shaped plate. Then add 100 μL of spare bacterial solution to each well, and the 11th and 12th columns are used as negative controls containing FTG culture medium only and positive controls containing bacterial solution only, respectively. Place the 96-well U-shaped plate that has completed bacterial solution inoculation in anaerobic culture at 37° C. for 12-16 hours and read the drug sensitivity results. In this experiment, *Bacteroides fragilis* (ATCC 25285) was used as the quality control bacterium. As shown in Table 4, most of the tested antibiotics have high MICs against *Clostridium perfringens*. The $MIC_{50}$ of lincomycin against *Clostridium perfringens* is 8 μg/mL, and the $MIC_{90}$ is greater than 128 μg/mL. The $MIC_{50}$ and $MIC_{90}$ of doxycycline are 8 μg/mL and 16 μg/mL, respectively. The $MIC_{50}$ and $MIC_{90}$ of tilmicosin are 128 μg/mL and greater than 128 μg/mL, respectively. The $MIC_{50}$ and $MIC_{90}$ of tiamulin is 0.5 g/mL and 8 μg/mL, respectively. The compound BAB159 provided by the present invention has excellent antibacterial effect on *Clostridium perfringens*, with $MIC_{50}$ and $MIC_{90}$ of 0.25 μg/mL and 0.5 μg/mL, respectively. Compared with commonly used antibiotics in clinical practice, BAB 159 has the highest MIC value of only 0.5 μg/mL against 26 tested strains of *Clostridium perfringens*, which was comparable to the antibacterial activity of ceftiofur, penicillin, and vancomycin. This indicates that the compound has comparable or even better efficacy compared to listed commonly used antibiotics and has good application prospects in the treatment of drug-resistant anaerobic *Clostridium* infections.

TABLE 4

Activity of BAB159 and some listed antibiotics against *Clostridium perfringens*

| | Strain | MIC value against *Clostridium perfringens* (μg/mL) | | | | | | | | |
|---|---|---|---|---|---|---|---|---|---|---|
| Type | number | BAB159 | CEF | PEN | VAN | LIN | DOX | TMS | TIA | QCT |
| A-type | A57-1 | 0.25 | ≤0.25 | 0.25 | ≤0.25 | 2 | ≤0.25 | 4 | 4 | ≤0.25 |
| | A3-1 | 0.5 | ≤0.25 | 0.25 | ≤0.25 | 1 | 8 | 4 | 0.5 | 0.5 |
| | A3-2 | 0.25 | ≤0.25 | 0.5 | ≤0.25 | 0.5 | 8 | 2 | 0.5 | ≤0.25 |
| B-type | B4 | 0.5 | ≤0.25 | 0.5 | ≤0.25 | >128 | 2 | >128 | 4 | ≤0.25 |
| | B5 | 0.25 | ≤0.25 | 0.5 | ≤0.25 | >128 | 8 | >128 | 0.5 | ≤0.25 |
| C-type | C3 | 0.5 | 1 | 2 | 0.5 | >128 | 16 | >128 | 8 | 1 |
| | C8 | 0.25 | ≤0.25 | 0.25 | ≤0.25 | 128 | ≤0.25 | >128 | 0.5 | ≤0.25 |
| | C59-1 | 0.25 | ≤0.25 | 0.125 | ≤0.25 | 0.5 | ≤0.25 | 2 | ≤0.25 | ≤0.25 |
| D-type | D14B | 0.25 | ≤0.25 | 0.5 | ≤0.25 | 64 | 1 | 128 | 8 | ≤0.25 |
| F-type | F5-2 | 0.25 | ≤0.25 | 0.125 | ≤0.25 | 128 | 4 | 128 | 0.5 | 0.5 |
| | F6-1 | 0.25 | ≤0.25 | 0.25 | 0.5 | 32 | 32 | 128 | 0.5 | 4 |
| | F6-2 | 0.5 | ≤0.25 | 0.125 | ≤0.25 | 32 | 16 | 128 | 0.5 | 0.5 |
| | F6-2-1 | 0.5 | ≤0.25 | 0.25 | ≤0.25 | 128 | 16 | >128 | 0.5 | 1 |
| | F6-2-2 | 0.25 | ≤0.25 | 0.25 | ≤0.25 | 128 | 16 | 128 | 0.5 | ≤0.25 |
| | F7-1 | 0.5 | ≤0.25 | 0.5 | 0.5 | >128 | 8 | 64 | 4 | ≤0.25 |
| | F8-1 | 0.5 | ≤0.25 | 0.25 | 0.5 | >128 | 16 | 128 | 4 | 0.5 |
| H-type | H12-1 | 0.25 | ≤0.25 | 0.25 | ≤0.25 | 0.5 | 4 | 4 | 0.5 | ≤0.25 |
| | H12-2 | 0.25 | ≤0.25 | 0.125 | ≤0.25 | ≤0.25 | 4 | 4 | ≤0.25 | ≤0.25 |
| | H13-1 | 0.5 | ≤0.25 | 0.0625 | ≤0.25 | 4 | 8 | 4 | 4 | ≤0.25 |
| | H14-1 | 0.5 | ≤0.25 | 0.25 | 0.5 | 8 | 8 | 128 | 8 | ≤0.25 |
| | H14-2 | 0.5 | ≤0.25 | 1 | ≤0.25 | 8 | 8 | 128 | 8 | 0.5 |
| | H14-4 | 0.5 | ≤0.25 | 0.125 | ≤0.25 | 4 | 4 | 128 | 4 | ≤0.25 |
| | H15-1 | 0.25 | ≤0.25 | 0.25 | 0.5 | ≤0.25 | 16 | 4 | ≤0.25 | ≤0.25 |

TABLE 4-continued

| Activity of BAB159 and some listed antibiotics against *Clostridium perfringens* | | | | | | | | | | |
|---|---|---|---|---|---|---|---|---|---|---|
| | Strain | | MIC value against *Clostridium perfringens* (μg/mL) | | | | | | | |
| Type | number | BAB159 | CEF | PEN | VAN | LIN | DOX | TMS | TIA | QCT |
| | H15-2 | 0.5 | ≤0.25 | 0.25 | ≤0.25 | 4 | 16 | 128 | 4 | ≤0.25 |
| | H15-3 | 0.25 | ≤0.25 | 0.25 | ≤0.25 | 4 | 8 | 4 | 4 | 0.5 |
| | H16 | 0.25 | ≤0.25 | 0.125 | 0.5 | 4 | 8 | 128 | 4 | ≤0.25 |

Figure 6:
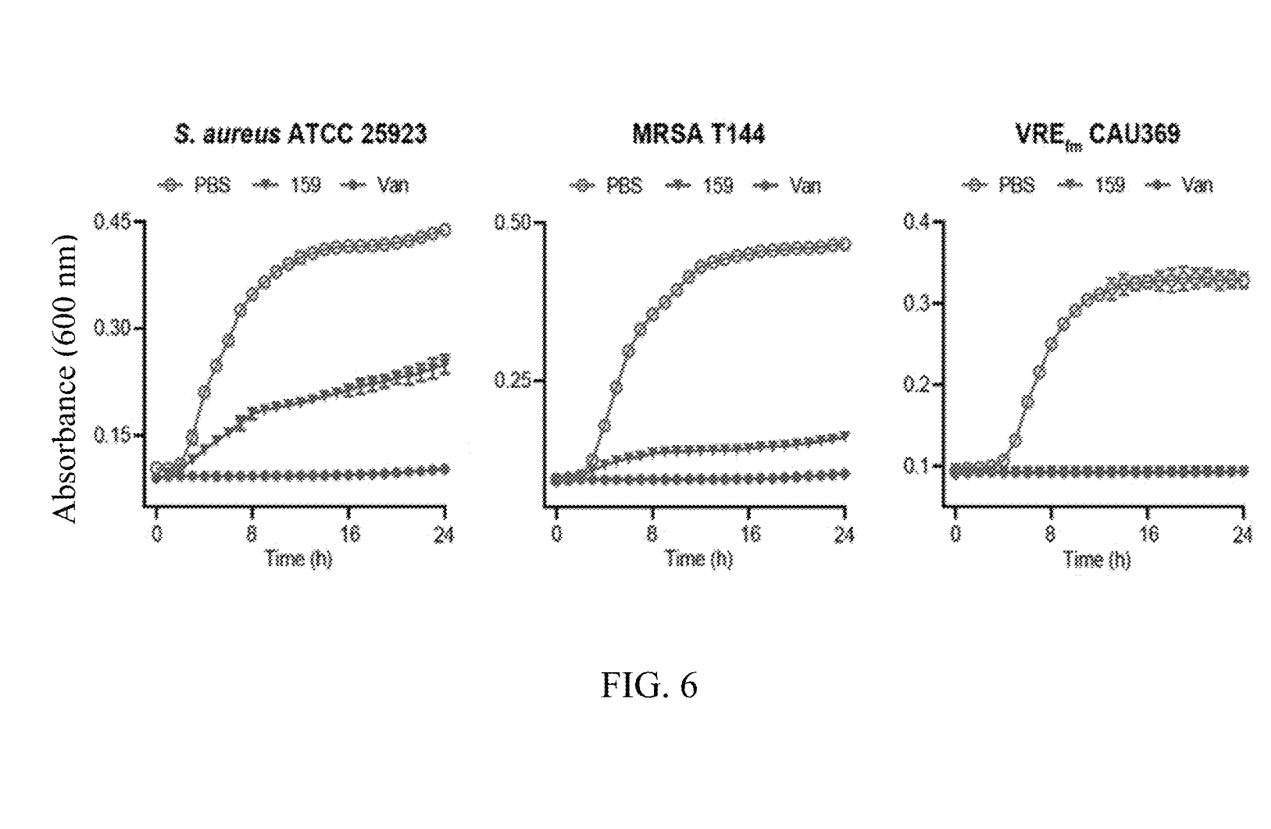
FIG. 6 shows the growth curves of *Staphylococcus aureus* ATCC 29213, MRSA T144, and vancomycin resistant *Enterococcus faecium* CAU369 under the action of BAB159.

Note:
CEF: Ceftiofur,
PEN: Penicillin,
VAN: Vancomycin,
LIN: Lincomycin,
DOX: Doxycycline,
TMS: Tilmicosin,
TIA: Tiamulin,
QCT: Quincetone.

Embodiment 4 Synergistic Antibacterial Efficacy of BAB159 and Polymyxin E

Using the chessboard broth dilution method for the combined treatment of BAB159 and polymyxin E against multidrug-resistant *E. coli* $B2_{(NDM\text{-}5+MCR\text{-}1)}$ was tested for synergistic efficacy (FIC). *E. coli* B2 single colony was picked and cultured in BHI broth on a shaker at 37° C. until logarithmic growth stage. Adjust the bacterial turbidity to 0.5 McF using a Maxwell turbidimeter and dilute 100-fold (−1.0×10$^6$ CFU/mL) with MHB culture medium for future use. Add 100 μL of polymyxin E with a concentration of 32 μg/mL to each well in the first column. Use a pipette to take 100 μL of the solution in sequence and dilute it 2-fold from the 1st column to the 7th column. Discard the excess liquid. Add 100 μL of BAB159 with a concentration of 2 μg/mL to each well in the 8th row. Use a pipette to take 100 μL of the solution and dilute it 2-fold from the 8th row to the 2nd row. Discard excess liquid. Subsequently, add 100 μL of diluted tested bacterial solution to each well from 1st column to 8th column. 11th column and 12th column represent negative and positive controls containing only MHB culture medium and only tested bacterial solution, respectively. The result is shown in FIG. 5.

Result interpretation: after incubation at 37° C. for 16-18 hours, read the FIC value, where FIC=MIC (polymyxin E when combined)/MIC (polymyxin E when used alone)+MIC (BAB159 when combined)/MIC (BAB159 when used alone). Where FIC>2 indicates antagonistic effect, 1<FIC≤2 indicates irrelevant effect, 0.5<FIC≤1 indicates additive effect, and FIC<0.5 indicates synergistic effect.

The results shows that when polymyxin E and BAB159 are used alone, MICs of polymyxin E and BAB159 against multidrug-resistant *E. coli* B2 are 8 μg/mL and >32 μg/mL, respectively. When used in combination, polymyxin E and BAB 159 have a significant synergistic effect at a concentration ratio of 1-3:1-3. The best synergistic effect is achieved when polymyxin E and BAB159 are used in a 1:1 concentration ratio. At this time, MICs of polymyxin E and BAB159 against *E. coli* B2 are both 0.5 μg/mL. At this ratio, BAB159 increases the MIC of polymyxin E by 16-fold and the FIC index is less than 0.078. BAB159 also shows a synergistic effect when combined with polymyxin B (FIC=0.5), but the effect is not as strong as polymyxin E, and no synergistic effect was observed when combined with ciprofloxacin and kanamycin (FIC=2).

This demonstrates that BAB159 provided by the present invention can be used in combination with polymyxin E to treat multidrug-resistant *E. coli* B2 exerts a synergistic antibacterial effect. The above results indicate that BAB159 not only has superior antibacterial activity on its own, but also can be combined with polymyxin to enhance its activity against pathogenic bacteria, especially multidrug-resistant bacteria. BAB159 provided by the present invention has good clinical application prospects.

TABLE 5

| Synergistic effect of BAB159 against polymyxin E (MICs unit: μg/mL) | | | | | |
|---|---|---|---|---|---|
| Drug A | MICs (drug A when used alone) | MICs (drug A when used in combination) | MICs (BAB159 when used alone) | MICs (BAB159 when used in combination) | Synergistic index (FIC) |
| Polymyxin E | 8 μg/mL | 0.5 μg/mL | >32 μg/mL | 0.5 μg/mL | <0.078 |
| Polymyxin B | 8 μg/mL | 2 μg/mL | >32 μg/mL | 8 μg/mL | 0.5 |
| Polymyxin C | 16 μg/mL | 4 μg/mL | >32 μg/mL | 16 μg/mL | 0.75 |
| Ciprofloxacin | 32 μg/mL | 32 μg/mL | >32 μg/mL | >32 μg/mL | 2.0 |
| Kanamycin | 128 μg/mL | 128 μg/mL | >32 μg/mL | >32 μg/mL | 2.0 |

Embodiment 5 Growth Curves of Common Pathogenic Bacteria Under the Action of BAB159

Select strains of *Staphylococcus aureus* ATCC 25923, MRSA T144, and vancomycin resistant *Enterococcus faecium* CAU369 for monoclonal transfer to BHI broth culture medium, and culture on a shaker at 37° C. and 200 rpm until logarithmic growth stage. Adjust the bacterial turbidity to 0.5 McF using a Maxwell turbidimeter and dilute 100-fold (−1.0×10$^6$ CFU/mL) with MH broth culture medium for future use. Dilute BAB159 to the desired concentration using MH broth culture medium, take 100 μL of BAB159 and add it to a 96-well flat plate. Add 100 µL of diluted bacterial solution to each well. Set up negative and positive controls containing only MH broth culture medium and the test bacterial solution. Set the temperature of the enzyme-linked analyzer system to 37° C. and measure the absorbance at OD 600 nm once per hour for a total of 24 hours. Three biological replicates were set for each treatment, as shown in FIG. 6. In FIG. 6, PBS represents the buffer group, 159 represents the compound BAB159 group, and van represents the vancomycin group. By observing the dynamic curve of bacterial growth, it can be more intuitively observed that compound BAB159 can significantly inhibit the growth of Staphylococcus aureus ATCC 25923, MRSA, and vancomycin resistant Enterococcus faecium CAU369 at its MIC concentration. The growth inhibition effect on vancomycin resistant Enterococcus faecium CAU369 is comparable to that of vancomycin.

Embodiment 6 Time-Kill Curve of BAB159

Figure 7:
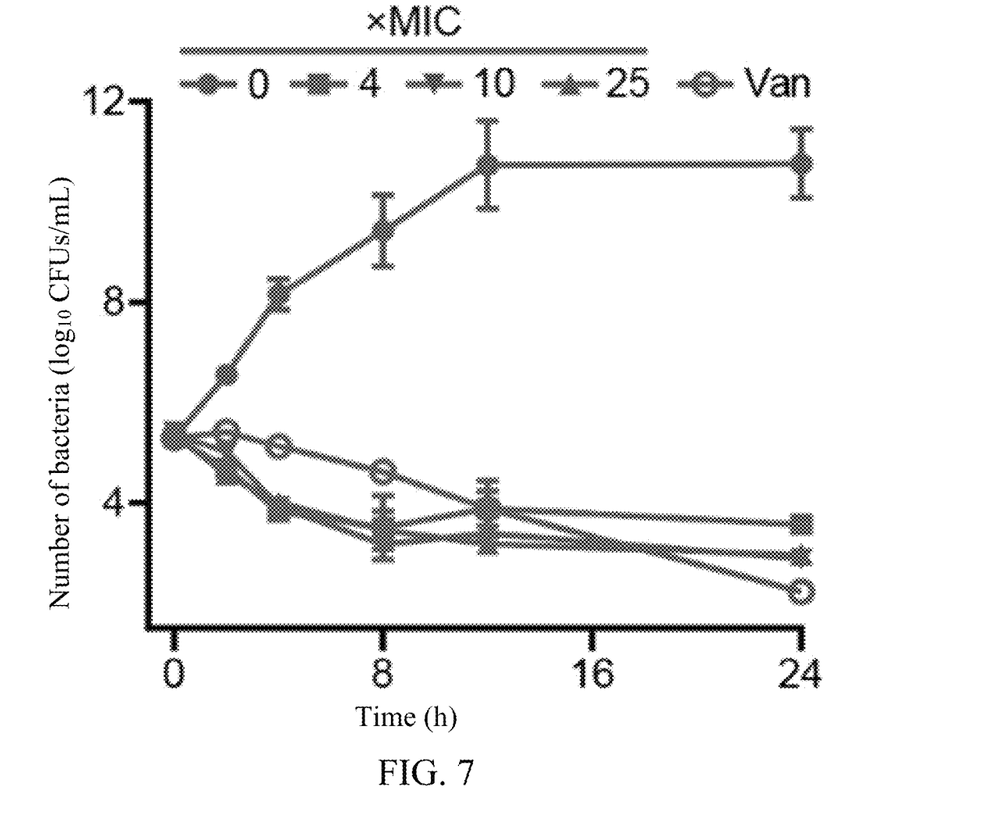
FIG. 7 shows the time-Kill curve of BAB159 against *Staphylococcus aureus* ATCC 25923.

Select monoclonal Staphylococcus aureus ATCC 25923 and culture it in 1 mL BHI broth culture medium at 37° C. and 200 rpm until logarithmic growth stage. Then, adjust the concentration of Staphylococcus aureus ATCC 25923 to 0.5 McF, and dilute it 100-fold to 5 mL of prepared MH broth to obtain a bacterial solution with a bacterial concentration of about $10^6$ CFU/mL. Add different concentrations of 159 (4×MIC, 10×MIC, and 25×MIC) to the bacterial broth, and add 10×MIC vancomycin (Van) and PBS buffer (0×MIC) to the bacterial broth as positive and negative control groups, respectively. Set 3 replicates for each treatment and incubate in a shaker at 37° C. and 200 rpm. Take out 100 µL of culture medium after the specific time point of the addition of antibacterial compounds, dilute it in PBS at a multiple ratio, coat and count, and invert at 37° C. for 24 hours to calculate the number of colonies. As shown in FIG. 7, with the increase of BAB159 concentration, its antibacterial efficacy did not significantly increase, but over time, the antibacterial effect became more significant at each concentration. Prove that BAB159 is a time-dependent fungicide. For time-dependent antibiotics, the pharmacokinetic/pharmacodynamic (PK/PD) parameter to be selected for dosage formulation is the ratio of the area under the drug time curve (AUC) to the MIC. Therefore, the AUC to MIC ratio was chosen for the subsequent formulation of BAB159 dosage.

Embodiment 7 Pharmacokinetic Characteristics of BAB159

In order to investigate the metabolic residues of BAB159 in model animals, rabbits were used as animal models to quantitatively analyze the levels of BAB159 in rabbit plasma. Male Chinese white rabbits weighing around 2 kg were adaptively fed for one week. Then, 2 mL of BAB159 suspension was injected into the left hind thigh muscle of the rabbits at a dose of 20 mg/kg b.w. Blood samples were collected from the ear vein at 8 time points, including 0.5, 1, 2, 4, 6, 8, 12, and 24 hours after administration. After pre-treatment of the plasma samples, UPLC-MS/MS detection was performed.

The results shows that after intramuscular injection, the $C_{max}$, $T_{max}$, and AUC in the plasma of rabbits are 207 µg/L, 6 h, and 1708 µg/L·h, respectively (Table 6). According to the antibacterial spectrum of BAB159, the $MIC_{50}$ of the compound against Staphylococcus is 15.6 µg/L. Pharmacokinetic parameters show that the area under the drug time curve AUC after intramuscular injection is 1708 µg/L·h, obtain AUIC=109. Research has shown that when the AUIC of time-dependent antibiotics is greater than 100, the compound is considered to have superior therapeutic effects (Pharmaceutics, 2021, 13 (5): 602). The above results indicate that the compound BAB159 of the present invention has great potential for application in the treatment of clinically relevant pathogenic infections.

TABLE 6

Pharmacokinetic parameters of BAB159 in rabbits

| Parameter | Unit | Numerical value |
|---|---|---|
| Dose | mg/kg b · w | 20 |
| $T_{max}$ | h | 6 |
| $C_{max}$ | µg/L | 148.2 ± 13.05 |
| Vd | L | 0.28 ± 0.03 |
| $AUC_{0-last}$ | µg/L · h | 1644.8 ± 70.5 |
| $T_{1/2}$ | h | 16.1 ± 3.6 |
| CL | mL/min | 0.01 ± 0.003 |

Note:
$T_{max}$: time to peak;
$C_{max}$: maximum blood drug concentration;
Vd: apparent distribution volume;
AUC: area under the drug time curve;
$T_{1/2}$: half-life;
CL: clearance constant.

Embodiment 8 Efficacy of Compound BAB159 in an In Vivo Animal Infection Model

Figure 8:
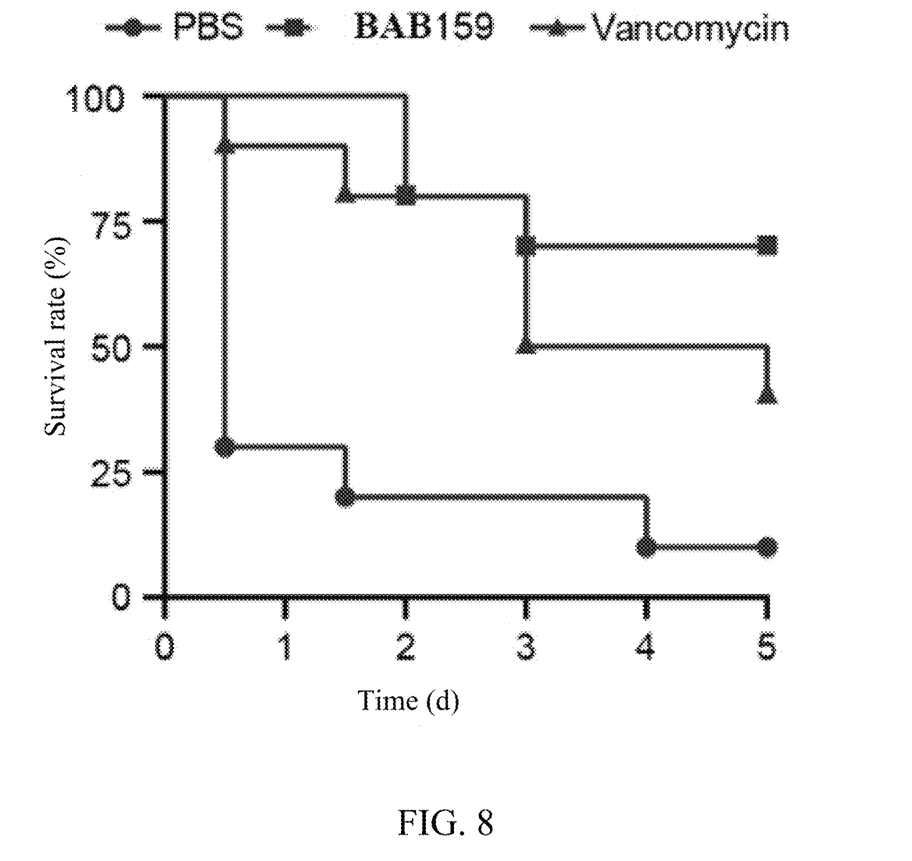
FIG. 8 shows the protective efficacy of BAB159 against infection by the *Galleria mellonella*.

In vivo infection model of the Galleria mellonella: randomly divide approximately 300 mg of Galleria mellonella larvae into 8 individuals per group. Each Galleria mellonella was injected with 10 µL of MRSA T144 bacterial suspension (final concentration of $5.5 \times 10^6$ CFU/individual) from its left proleg. After 1 hour of bacterial infection, 10 µL of BAB159 solution was injected into the right proleg of the Galleria mellonella at a dose of 2 mg/kg b.w. The positive control was vancomycin with a concentration of 2 mg/kg b.w. Record the survival rate of each group of the Galleria mellonella daily for 5 days. FIG. 8 shows the protective efficacy of compound BAB159 against infection by the Galleria mellonella. In the infection model of the Galleria mellonella, the protective rate of BAB159 against the Galleria mellonella within 5 days of infection was 70%, which was better than the 40% of vancomycin.

Figure 9:
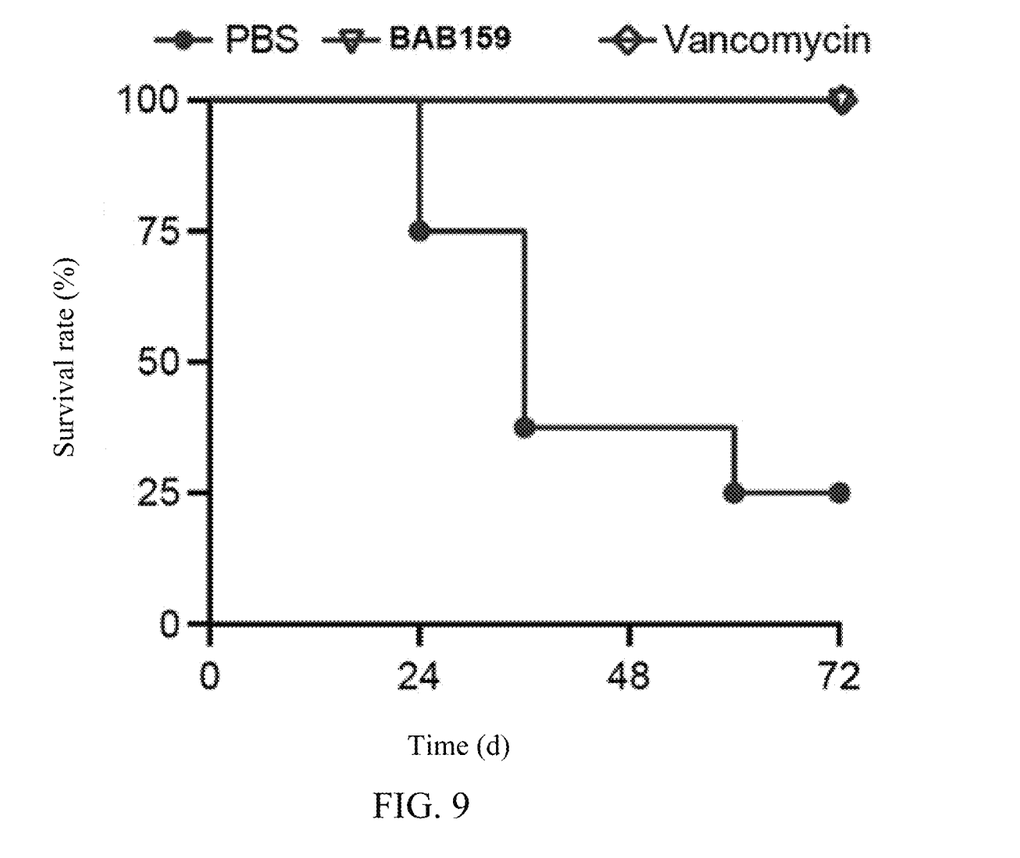
FIG. 9 shows the survival rate of infected mice under the action of BAB159.

Mouse bacteremia model: C57BL/6J female mice weighing between 18-20 g were used. After one week of adaptive feeding, the mice were randomly divided into 5 groups, with 7 mice in each group. Each mouse was intraperitoneally injected with 200 µL of MRSA T144 bacterial suspension (final concentration of $1.5 \times 10^8$ CFU/individual). After 1 hour of bacterial infection, mice were administered corresponding compounds and positive control vancomycin at a dose of 10 mg/kg b.w. Record the survival rate of mice within 72 hours. FIG. 9 shows the survival rate of mice infected with BAB159. In the mouse infection model, the protective rate of BAB159 on mice within 3 days was 100%, which was comparable to the efficacy of vancomycin and significantly stronger than the PBS group.

The above results indicate that BAB159 provided by the present invention has excellent antibacterial activity against common clinical pathogenic bacteria and fungi, and its effect is superior to some listed antibiotics. At the same time, the pharmacokinetic parameters of BAB 159 are suitable and have shown good therapeutic effects on both the Galleria mellonella and rabbit infection models, indicating that BAB 159 can be used for the treatment of related pathogenic bacterial infections and has good clinical application prospects.

The invention claimed is:

1. A compound with broad-spectrum antibacterial activity, wherein the compound is compound BAB159:

BAB159

2. An antibacterial composition, comprising the compound according to claim 1 and polymyxin.

3. The antibacterial composition according to claim 2, wherein in the antibacterial composition, a concentration ratio of the compound to polymyxin is 1:3.

4. The antibacterial composition according to claim 2, wherein, the polymyxin is selected from at least one of polymyxin A, polymyxin B, polymyxin C, polymyxin D, and polymyxin E.

5. An antibacterial drug, comprising the compound with broad-spectrum antibacterial activity according to claim 1, wherein the antibacterial drug has an inhibitory effect on fungi and a bactericidal effect on bacteria, the bacteria is selected from at least one of *Staphylococcus, Clostridium perfringens, Enterococcus, Bacillus, Streptococcus, Haemophilus*, and *Mycobacterium smegmatis*, and the fungi is selected from at least one of *Candida, Aspergillus niger, Aspergillus flavus*, and *Trichophyton*.

6. An antibacterial drug, comprising the composition according to claim 2, wherein the antibacterial drug has an inhibitory effect on fungi and a bactericidal effect on bacteria, wherein the bacteria is selected from at least one of *Staphylococcus, Clostridium perfringens, Enterococcus, Bacillus, Streptococcus, Haemophilus*, and *Mycobacterium smegmatis*, and the fungi is selected from at least one of *Candida, Aspergillus niger, Aspergillus flavus*, and *Trichophyton*.

7. An antibacterial drug, comprising the composition according to claim 3, wherein the antibacterial drug has an inhibitory effect on fungi and a bactericidal effect on bacteria, wherein the bacteria is selected from at least one of *Staphylococcus, Clostridium perfringens, Enterococcus, Bacillus, Streptococcus, Haemophilus*, and *Mycobacterium smegmatis*, and the fungi is selected from at least one of *Candida, Aspergillus niger, Aspergillus flavus*, and *Trichophyton*.

8. An antibacterial drug, comprising the composition according to claim 4, wherein the antibacterial drug has an inhibitory effect on fungi and a bactericidal effect on bacteria, wherein the bacteria is selected from at least one of *Staphylococcus, Clostridium perfringens, Enterococcus, Bacillus, Streptococcus, Haemophilus*, and *Mycobacterium smegmatis*, and the fungi is selected from at least one of *Candida, Aspergillus niger, Aspergillus flavus*, and *Trichophyton*.

* * * * *